(12) United States Patent
Pisarevsky (10) Patent No.: US 9,821,946 B2
(45) Date of Patent: Nov. 21, 2017

(54) BEVERAGE CONTAINER WITH CLOSURE AND INTEGRATED STRAW

(71) Applicant: Eric Pisarevsky, Montreal (CA)

(72) Inventor: Eric Pisarevsky, Montreal (CA)

( * ) Notice: Subject to any disclaimer, the term of this patent is extended or adjusted under 35 U.S.C. 154(b) by 0 days.

(21) Appl. No.: 15/349,095

(22) Filed: Nov. 11, 2016

(65) Prior Publication Data

US 2017/0164768 A1    Jun. 15, 2017

Related U.S. Application Data

(60) Provisional application No. 62/267,414, filed on Dec. 15, 2015.

(51) Int. Cl.
| | | |
|---|---|---|
| *B65D 81/38* | (2006.01) | |
| *B65D 25/28* | (2006.01) | |
| *B65D 47/06* | (2006.01) | |
| *B65D 53/02* | (2006.01) | |
| *A47G 19/22* | (2006.01) | |

(52) U.S. Cl.
CPC ..... *B65D 81/3869* (2013.01); *A47G 19/2266* (2013.01); *B65D 25/2867* (2013.01); *B65D 47/06* (2013.01); *B65D 53/02* (2013.01)

(58) Field of Classification Search
CPC ............ A47G 19/2272; A47G 19/2266; A47G 19/2205; A47G 21/18; A47G 21/186; B65D 47/061; B65D 47/065; B65D 47/06; B65D 53/02; B65D 81/3869; B65D 81/3865; B65D 25/2867; B65D 25/2838; B65D 25/2835
USPC ....... 220/737, 709, 708, 705, 756, 752, 212, 220/760, 759; 215/229, 388, 387, 218; 206/217, 216
See application file for complete search history.

(56) References Cited

U.S. PATENT DOCUMENTS

| | | | | |
|---|---|---|---|---|
| 4,886,176 A | * | 12/1989 | Steakley | ................. A45C 11/20 16/111.1 |
| 5,816,439 A | * | 10/1998 | Lovell | .................... B65D 25/32 220/760 |
| 6,739,933 B2 | * | 5/2004 | Taylor | ....................... A45F 5/00 220/703 |
| 2007/0039973 A1 | * | 2/2007 | Boenig | ................. A45C 13/005 220/847 |
| 2012/0138622 A1 | * | 6/2012 | Slansky | ............. B65D 43/0218 220/780 |

* cited by examiner

*Primary Examiner* — Robert J Hicks (57) ABSTRACT

A beverage container with closure and integrated straw comprises a lower body container, an upper body cap, an integrated straw and a swivel handle. The container includes a hollow interior space to receive a beverage and is reusable. The upper body cap and swivel handle are configured to bend and fold the straw providing a closure for beverage container and preventing spillage. The swivel handle is configured to serve as a base for the beverage container and as a handle for the beverage container. The straw is configured to be bended and folded to seal and to be removed for easy cleaning and replacement.

12 Claims, 6 Drawing Sheets

BEVERAGE CONTAINER WITH CLOSURE AND INTEGRATED STRAW

CROSS REFERENCE TO PREVIOUS APPLICATION

This application claims the benefit of priority with the U.S. Provisional Application No. 62/267,414 filed Dec. 15, 2015, which is incorporated herein by reference.

TECHNICAL FIELD

Embodiments of the present invention generally relate to a beverage container, and more particularly relate to a beverage container with closure and integrated straw.

BACKGROUND

Upright, disposable beverage containers prefilled with juice or other beverage, commonly referred to as juice boxes, are popular consumer items especially among young children and youth. These containers are usually rectangular shaped boxlike containers with a straw wrapped in plastic attached to the side of the container. The straw is removed and used to pierce a sealed aperture on the top surface of the container. The straw is then inserted in to the aperture and the user uses the straw to drink the beverage in the container. These juice boxes provide a portable and lightweight drinking container for a beverage.

One of the most important problems with these juice boxes is the disposable nature of the beverage containers. These containers are designed for single use only. Once opened, they cannot be stored in a manner that will ensure no spillage. Therefore, a user has to consume all of the contents of the juice box once it is opened. The user cannot save any juice for another time. In addition, the containers themselves cannot be reused and need to be disposed of, negatively impacting the environment.

Another problem with these containers is the straw. The straw is wrapped in a plastic wrapper and attached to the container with a small dab of glue. The straw can easily dislodge and get lost. The attached straw has a sharp tip at one end to pierce the sealed aperture, if the attached straw is lost a regular straw would not be an effective replacement to pierce the sealed aperture, in addition, it can be difficult to pierce the sealed aperture even with the attached straw. These juice boxes are targeted towards young children who lack the strength and manual dexterity to pierce the sealed aperture using the attached straw. Also, the construction of the juice box is not sturdy enough to ensure that the force used to pierce the aperture will not cause the box to be squeezed or to fall, causing spillage.

In general, juice boxes are prone to spillage and mishandling due to their lightweight construction, especially since the juice boxes are primarily targeted towards children who may not have the skill to handle the lightweight containers. The juice boxes do not have a handle or other carrying mechanism to support the juice boxes once they are opened.

Therefore, there is a need for a reusable beverage container which includes a closure to allow for later use, a handle to hold the juice box while drinking and to support the container in an upright or prone position, and an integrated straw. In addition, there is a need for a beverage container made of a stronger and more resistant construction to reduce spillage, especially when handled by children.

SUMMARY OF THE INVENTION

Embodiments of the current disclosure relate to a reusable beverage container with a closure and integrated straw that may provide for storage of the unfinished beverage within the beverage container and improved handling of the beverage container and is of stronger and more resistant construction. The current embodiment is similar in shape to a traditional disposable juice box providing familiarity and comfort especially to young children.

Generally, the disclosed invention provides for the beverage container with closure and integrated straw includes a lower body container, an upper body cap coupled to the lower body container, a swivel handle attached to the lower body container, an integrated straw including a flexible straw and a tube; and the swivel handle attached to the lower body container by means of one or more circular screw thread molded onto the outside wall or walls of the lower body container and sealed by means of a clamp mechanism glued to the center of the circular screw thread.

In some embodiments, an insulating beverage container with closure, and integrated straw includes an upper body cap having one or more groove and raised ridges on the upper plane surface thereof, a lower body container coupled to the upper body cap, a swivel handle attached to the lower body container, an integrated straw including a flexible straw and a tube, wherein the tube is sized to ensleeve the flexible straw, and said swivel handle is attached to the lower body container by means of one or more circular screw thread molded onto the outside wall or walls of the lower body container and sealed with a clamp mechanism glued to the center of the circular screw thread.

In some embodiments, the integrated straw includes an upper flexible section of the straw made of silicone or other flexible material inserted into an aperture on the top surface of the upper body cap so that there is an extended portion of the straw and a lower portion of the straw located in the underside of the cap. The lower portion of the straw ensleeves a plastic tube the remainder of which extends into the lower body portion of the beverage container.

In some embodiments, the handle is adapted to swivel around an axis, such that it serves to bend and fold the integrated straw into the upper plane surface of the upper body cap and substantially covering it thereby sealing the drinking aperture and preventing spillage. The handle is further adapted to swivel to a holding position to provide easier handling of the container and reduced spillage when drinking therefrom. The handle is further adapted to serve as a base for a beverage container in a diagonal position configured to enable to a user to drink from the container without having to hold the container.

BRIEF DESCRIPTION OF THE DRAWINGS

For a better understanding of the embodiments and to show how it may be carried into effects, reference will now be made, purely by way of example, to the accompanying drawings.

With specific reference now to the drawings in detail, it is stressed that the particulars shown are by way of example and for purposes of illustrative discussion of selected embodiments only, and are presented in the cause of providing what is believed to be the most useful and readily understood description of the principles and conceptual aspects. In this regard, no attempt is made to show structural details in more detail than is necessary for a fundamental understanding; the description taken with the drawings making apparent to those skilled in the art how the several selected embodiments may be put into practice. In the accompanying drawings.

DETAILED DESCRIPTION

It is noted that the systems and methods of the invention herein may not be limited in their application to the details of construction and the arrangement of the components or methods set forth in the following description or illustrated in the drawings and examples. The systems and methods of the invention may be capable of other embodiments or may be practiced or carried out in various ways.

Alternative methods and materials similar or equivalent to those described herein may be used in the practice or testing of embodiments of the disclosure. Nevertheless, particular methods and materials are described herein for illustrative purposes only. The materials, methods, and examples are not intended to be necessarily limiting.

Accordingly, various embodiments may omit, substitute, or add various procedures or components as appropriate. For instance, it should be appreciated that the methods may be performed in an order different than described, and that various steps may be added, omitted or combined. Also, aspects and components described with respect to certain embodiments may be combined with various other embodiments.

The disclosure herein generally relates to a device associated with a beverage container with closure and integrated straw.

It is noted that the beverage container with closure and integrated straw may be useful to store the beverage therein for consumption at a later time.

It is noted that the beverage container with closure and integrated straw may reduce spillage when opening and closing the beverage container.

It is noted that the beverage container with closure and integrated straw may be used multiple times.

It is noted that the beverage container with closure and integrated straw includes a handle configured for handling the beverage container when drinking.

It is noted that the beverage container with closure and integrated straw includes a handle configured to support the beverage container, for example, in a diagonal position.

Figure 1:
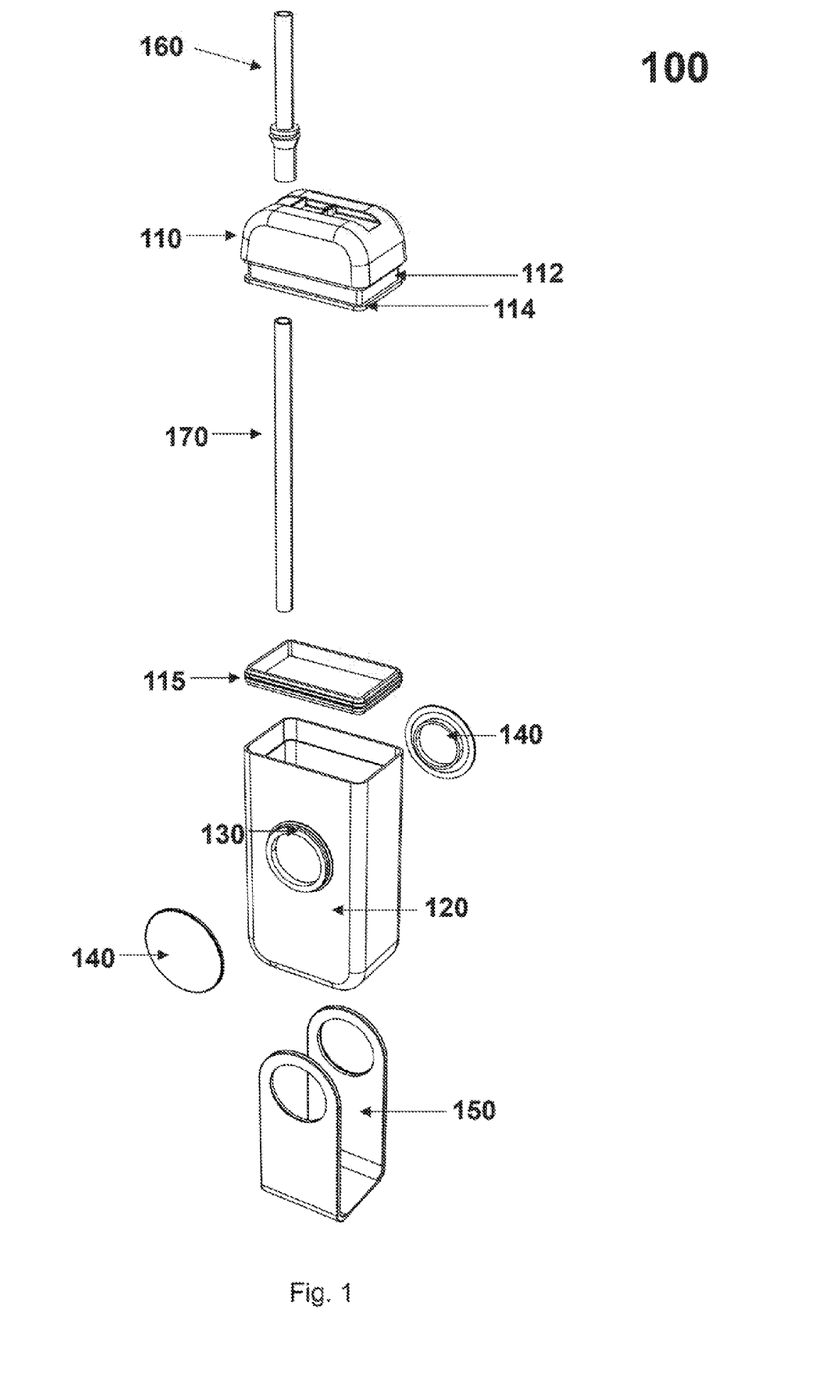
FIG. 1 illustrates an exploded perspective view of a beverage container with closure and integrated straw, according to an embodiment of the disclosure.

Reference is now made to FIG. 1, there is illustrated an exploded perspective view of a beverage container with closure and integrated straw 100. The beverage container 100 includes a sealable upper body cap 110, a lower body container 120 including a circular screw thread 130 molded onto the outside wall or walls of the lower body container 120, a swivel handle 150, a clamp mechanism 140, a flexible straw 160 and a plastic tube 170.

The closure of beverage container 100 may include the upper body cap 110, the lower body container 120, and the swivel handle 150. In some embodiments, the swivel handle 150 may be configured to attach to the lower body container 120 by screwing onto the circular screw thread 130 and sealed with the clamp mechanism 140, for example, by gluing the clamp mechanism 140 to the center of the circular screw thread 130.

The upper body cap 110 may be coupled to the lower body container 120. The upper body cap 110 may include a protective ring 115, made of silicon or other appropriate material, configured for smooth closure and increased protection against spillage when the upper body cap 110 is coupled to the lower body 120. The protective ring 115 may be fit into portion 112 of the upper body cap 110. The flange 114 may secure the protective ring 115 from slipping out of the upper body cap 110. In some embodiments, the protective ring 115 may be removable from the upper body cap 110.

In some embodiments, the upper body cap 110 and the lower body container 120 may be configured to the shape and proportion of a disposable single use drinking container.

In some embodiments, the upper body cap 110 and lower body container 120 may be double walled to gain a degree of insulation.

In some embodiments, the upper body cap 110 and the lower body container 120 may be made of transparent material.

In some embodiments, the upper body cap 110 and the lower body container 120 may be made of a solid opaque material to gain a degree of insulation, thus keeping the beverage therein at a desired temperature for a longer time.

It is further noted that the upper body cap 110 and the lower body container 120 are shown shaped as a rectangular cross section having a hollow inner space, by way of example only. The upper body cap 110 and the lower body container 120 may have other cross sectional shapes such as square cross section, elliptical cross section, triangular cross section and various combinations, all having hollow inner space.

Figure 2:
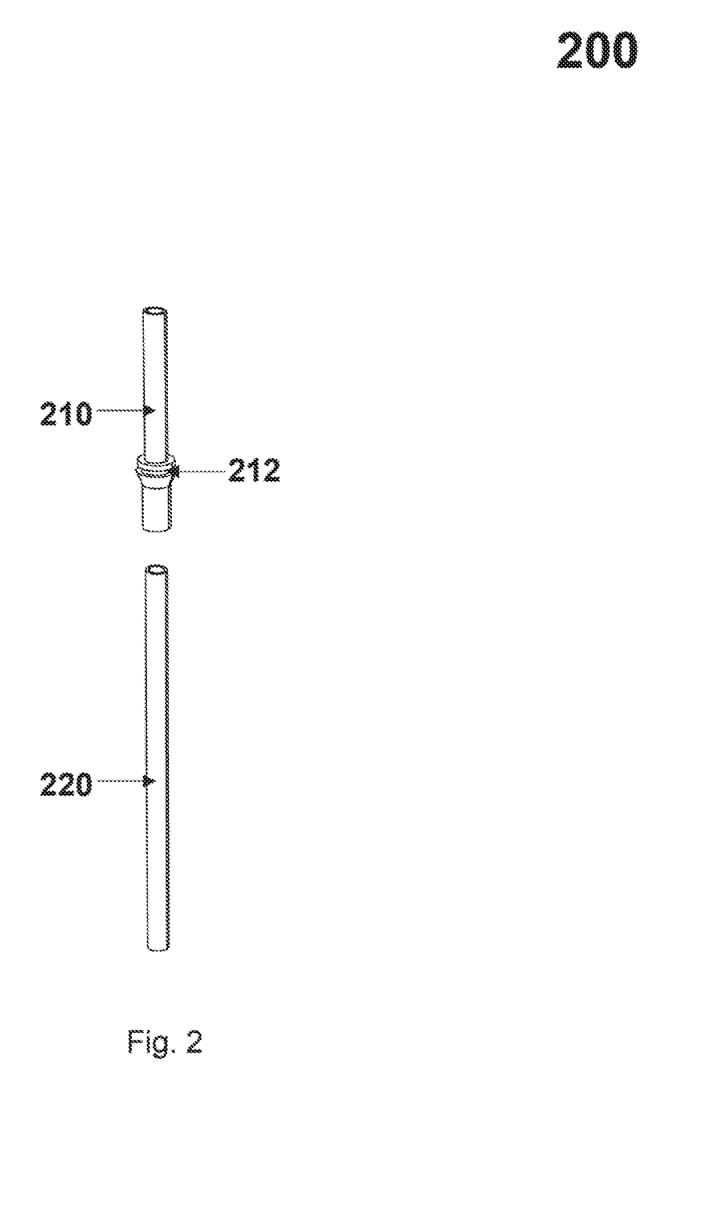
FIG. 2 illustrates an exploded perspective view of an integrated straw, according to an embodiment of the disclosure.

Reference is now made to FIG. 2, there is illustrated, in some embodiments, an exploded perspective view of an integrated straw 200. In this exemplary embodiment, the integrated straw 200 includes generally a flexible straw 210 and a tube 220.

The flexible straw 210 includes a screw thread 212 configured to screw into an aperture (see FIG. 3) of the upper body cap 110. The flexible straw 210 may be removed and reattached to the upper body cap 110 for cleaning and replacement purposes. As described herein, when the flexible straw 210 is attached to the tube 220 to form an integrated straw, the integrated straw may be removed and reattached to the upper body cap 110 for cleaning and replacement purposes.

Figure 4A:
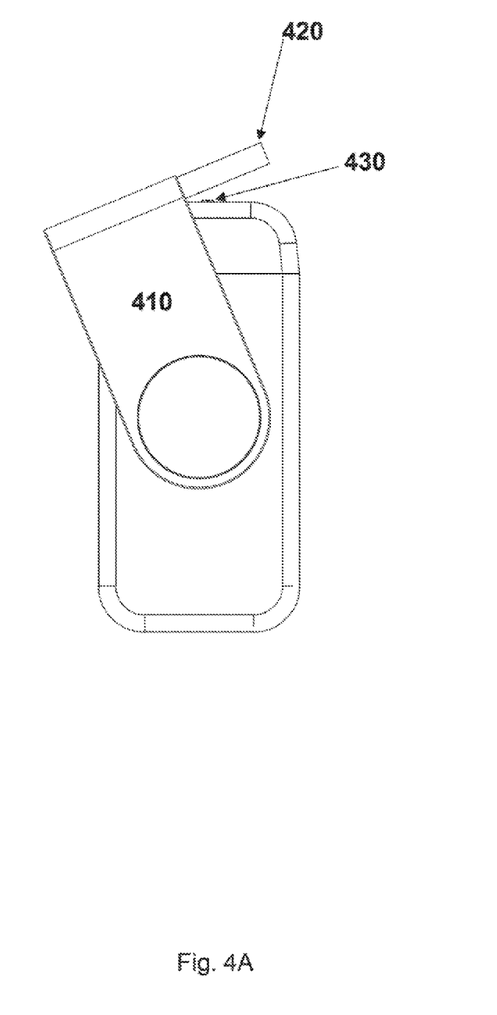
FIG. 4A illustrates a front view of a beverage container with closure and integrated straw, according to an embodiment of the disclosure.
Figure 4B:
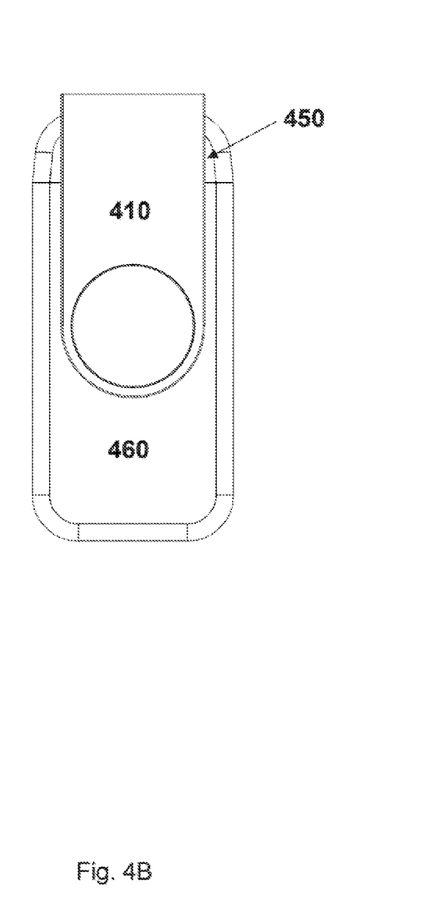
FIG. 4B illustrates another front view of a beverage container with closure and integrated straw, according to an embodiment of the disclosure.

The screw thread 212 of the flexible straw 210 may also be configured to support the flexible construction of the straw 210 and may prevent breakage when bent and folded by the swivel handle 150 closing the beverage container 100 (see FIGS. 4A and 4B).

The tube 220 may have an inner space with a diameter smaller than the diameter of the lower portion of the flexible straw 210, so that the lower portion of the flexible straw 210 may be inserted over and ensleeve the upper portion of the tube 220 to allow a smooth sipping action. The tube 220 is sized for smooth engagement and separation with the flexible straw 210.

The tube 220 may be made of plastic or other appropriate material configured for strong construction and easy cleaning.

Figure 3:
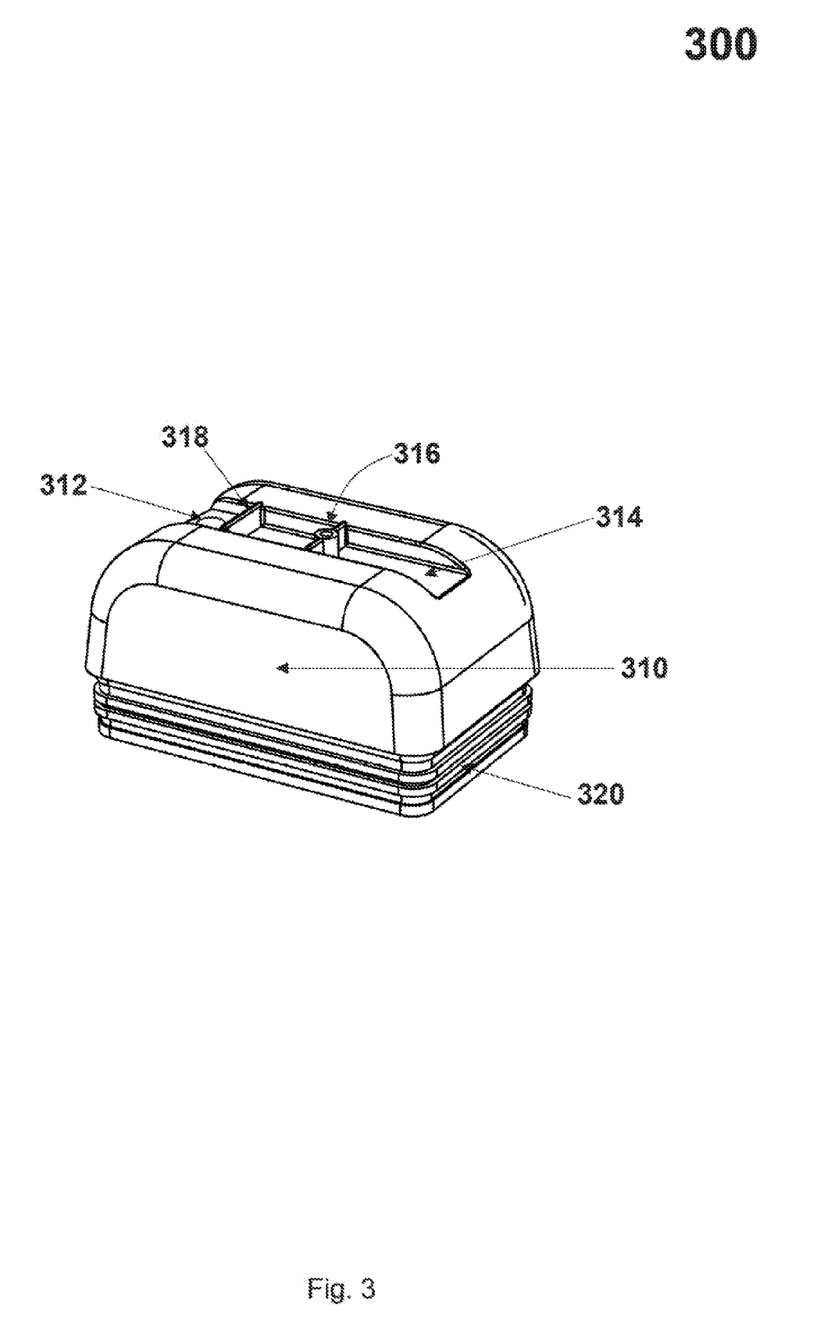
FIG. 3 illustrates a perspective view of an upper body cap of a beverage container, according to an embodiment of the disclosure.

Reference is now made to FIG. 3, there is illustrated, in some embodiments, a perspective view of an upper body cap 300. In this exemplary embodiment, the upper body cap with an integrated straw 300 includes generally an upper body cap 310 and a protective ring 320.

The upper body cap 310 may include an aperture 312 sized to removably receive the flexible straw 210 and tube 220 (see FIG. 2). The flexible straw 210 includes a screw thread 212 configured to fit into the aperture 312 (see FIG. 2).

The upper body cap 310 may include a groove 314 sized to receive the flexible straw 210 when the beverage container is in a closed position with the flexible straw 210 bent and folded into a flush position with the top plane surface of the upper body cap 310 (see FIG. 4A and FIG. 4B). As will be described herein, the beverage container may be closed by swivelling a handle 150 over the upper body cap 310 which is positioned at the top of the beverage container, causing the handle 150 to push, or bend, the flexible straw 210 into the groove 314. The bent position of the flexible straw 210 may prevent beverage from inside the beverage container to spill.

The upper body cap 310 may include one or more, raised ridges 318 molded into the groove 314 of the upper body cap 310. The raised ridges 318 may advantageously provide an additional seal for the flexible straw 210 when the flexible straw 210 is pushed into the groove 314, and held in the groove 314 by the handle 150, preventing spillage of beverage within the straw 210 (see FIGS. 4A and 4B).

The upper body cap 310 may include a small ventilation aperture 316 on one of the raised ridges 318 configured to allow for ventilation while a user is sipping the beverage.

The upper body cap 310 may include a protective ring 320 made of silicon or other suitable material sized to fit the inner portion of the lower body container 120 configured to easily open and seal the upper body cap 310 to the lower body container 120 and to provide increased protection against spillage.

Reference is now made to FIG. 4A, there is illustrated, in some embodiments, a front view of a beverage container with closure and integrated straw 400. In this exemplary embodiment, the beverage container 400 is in an upright position ready for closure.

The swivel handle 410 may serve to bend and fold the straw 420 into the groove 314 (see FIG. 3) and onto the raised ridges 430 sealing the beverage inside the beverage container, thereby preventing spillage.

Reference is now made to FIG. 4B, there is illustrated a front view a beverage container with closure and integrated straw 400 in a closed position. In this exemplary embodiment, the beverage container 400 is in an upright position, sealed closed and ready for storage.

The swivel handle 410 serves to bend and fold the straw 420 completely onto the raised ridges 430 (not shown) and into the groove 314, and substantially cover the flexible straw 420, sealing the beverage inside the beverage container, thereby preventing spillage.

Additionally, as shown in FIG. 4B, the swivel handle 410 may be positioned to hold the lower body container 460 and the upper body cap 450 in position to provide additional sealing closure of the upper body cap 450 to the lower body container 460.

Figure 5:
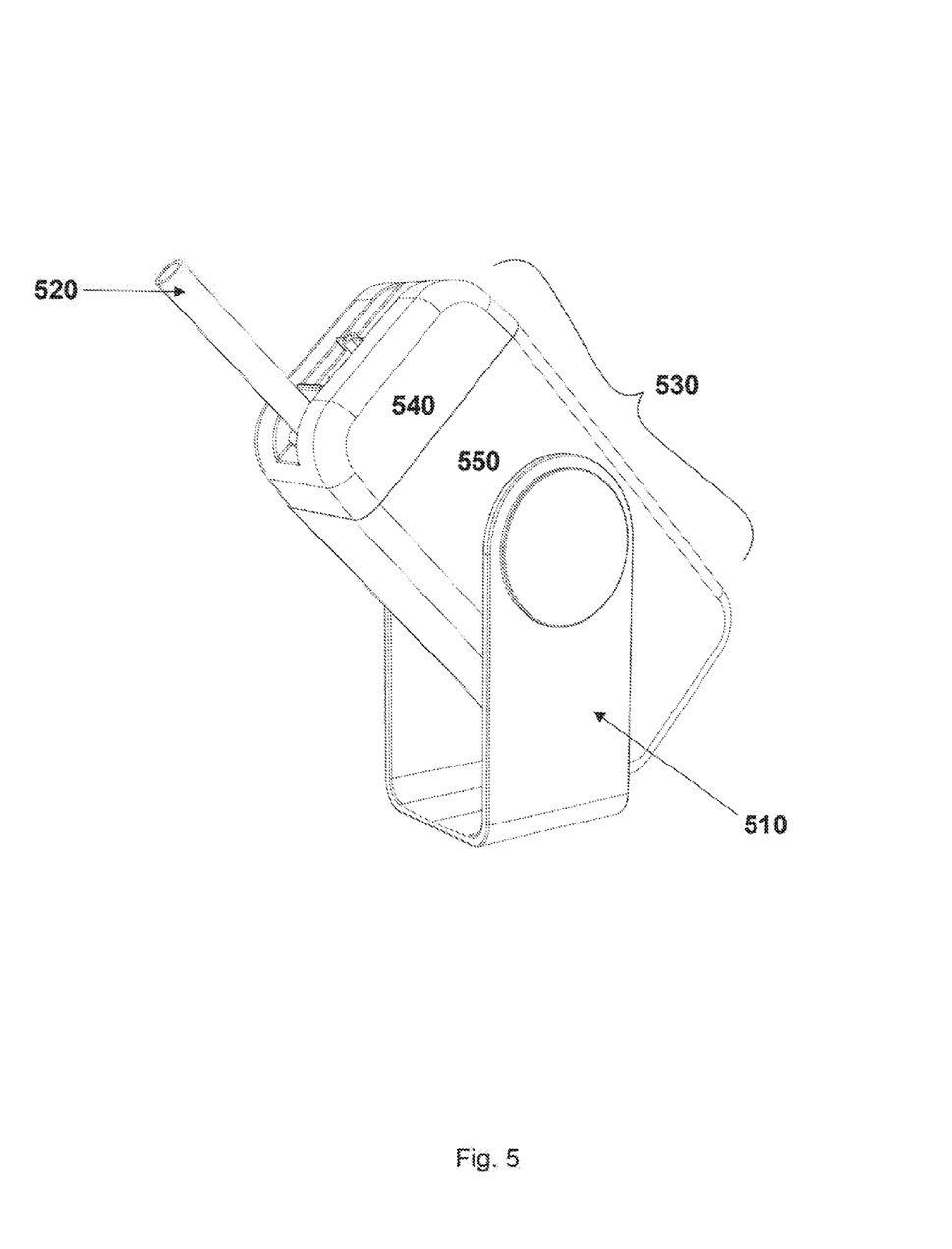
FIG. 5 illustrates a perspective view of a beverage container with closure and integrated straw, according to an embodiment of the disclosure.

Reference is now made to FIG. 5, there is illustrated, in some embodiments, a perspective view of a beverage container with closure and integrated straw 500. In this exemplary embodiment, the beverage container body 530, which includes the upper body cap 540 and the lower body container 550, is in a diagonal position.

The swivel handle 510 may be swivelled, for example, to a base position, such that the handle may serve as a base for the beverage container body 530 at a diagonal position. The integrated straw 520 is extended and ready for use for drinking. In this position, the beverage container with closure and integrated straw 500 is configured to allow the user to drink without having to handle the container.

Figure 6:
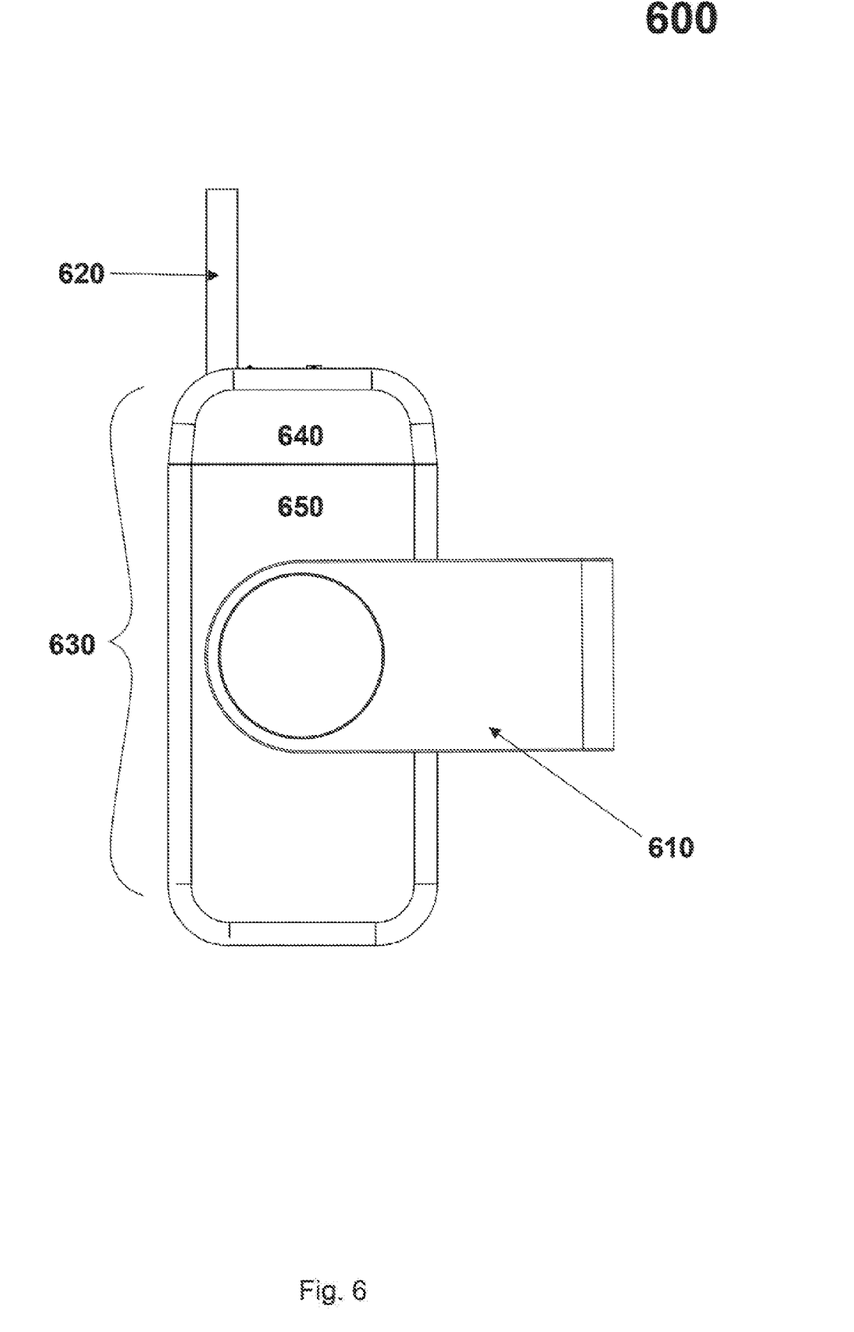
FIG. 6 illustrates another front view of a beverage container with closure and integrated straw, according to an embodiment of the disclosure.

Reference is now made to FIG. 6, there is illustrated, in some embodiments, a front view of a beverage container with closure and integrated straw 600. In this exemplary embodiment, the beverage container body 630, which includes the upper body cap 640 and the lower body container 650, is in an upright position and open for use. The integrated straw 620 is extended and ready for use.

The swivel handle 610 may be swivelled such that the user may use the handle 610 to hold or carry the beverage container 630 while drinking. In the example of FIG. 6, the swivel handle 610 may be swiveled to a horizontal position.

It should be appreciated to those skilled in the art that the invention may not be limited to the details of the foregoing illustrative embodiments and that the present invention may use various other embodiments in other specific forms without departing from the nature or essential attributes thereof. The present embodiments are therefore to be considered in all respects as illustrative and not restrictive.

Those skilled in the art to which this invention pertains will readily appreciate that numerous changes, variations and modifications can be made without departing from the scope of the invention mutatis mutandis.

Technical and scientific terms used herein should have the same meaning as commonly understood by one of ordinary skill in the art to which the disclosure pertains. Nevertheless, it is expected that during the life of a patent maturing from this application many relevant systems and methods will be developed. Accordingly, the scope of the terms such as computing unit, network, display, memory, server and the like are intended to include all such new technologies a priori.

The terms "comprises", "comprising", "includes", "including", "having" and their conjugates mean "including but not limited to" and indicate that the components listed are included, but not generally to the exclusion of other components. Such terms encompass the terms "consisting of" and "consisting essentially of".

The phrase "consisting essentially of" means that the composition or method may include additional ingredients and/or steps, but only if the additional ingredients and/or steps do not materially alter the basic, and novel characteristics of the composition or method.

As used herein, the singular form "a", "an" and "the" may include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments or to exclude the incorporation of features from other embodiments.

The word "optionally" is used herein to mean "is provided in some embodiments and not provided in other embodiments". Any particular embodiment of the disclosure may include a plurality of "optional" features unless such features conflict.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween. It should be understood, therefore, that the description in range format is merely for convenience and brevity and should not be construed as an inflexible limitation on the scope of the disclosure. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6 as well as non-integral intermediate values. This applies regardless of the breadth of the range.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

Although the disclosure has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the disclosure.

While the disclosure has been described with reference to the present invention, it will be understood by those skilled in the art that various changes may be made and equivalents may be substituted for elements thereof without departing from the scope of the disclosure, in addition, many modifications may be made to adapt a particular situation or material to the teachings of the disclosure without departing from the essential scope thereof. Therefore, it is intended that the disclosure not be limited to the particular embodiments disclosed as the best mode contemplated for carrying out this disclosure, but that the disclosure will include all embodiments falling within the scope of the appended claims.

What is claimed is:

1. A beverage container with closure and integrated straw comprising:
    a lower body container;
    an upper body cap coupled to the lower body container;
    a swivel handle attached to the lower body container;
    an integrated straw including a flexible straw and a tube; and
    said swivel handle attached to the lower body container by means of one or more circular screw threads molded onto the outside wall or walls of the lower body container and sealed by means of a clamp mechanism glued to the center of the circular screw thread.

2. The beverage container with closure and integrated straw of claim 1, wherein the swivel handle is configured to swivel to bend and fold said flexible straw into a flush position with the top plane surface of the upper body cap.

3. The beverage container with closure and integrated straw of claim 1, wherein the upper body cap includes a groove to receive the flexible straw.

4. The beverage container with closure and integrated straw of claim 3, wherein the groove includes one or more raised ridges.

5. The beverage container with closure and integrated straw of claim 1, wherein the swivel handle is positioned to further hold the lower body container and the upper body cap in a closed position.

6. The beverage container with closure and integrated straw of claim 1, wherein the swivel handle is positioned to a base position to support the lower body container and the upper body cap in a diagonal position.

7. The beverage container with closure and integrated straw of claim 1, wherein the swivel handle is positioned to a horizontal position.

8. The beverage container with closure and integrated straw of claim 1, wherein the integrated straw is configured to screw into an aperture in the upper body cap.

9. The beverage container with closure and integrated straw of claim 8, wherein the integrated straw is configured to be removable.

10. The beverage container with closure and integrated straw of claim 1, wherein the upper body cap includes a silicon protective ring.

11. The beverage container with closure and integrated straw of claim 1, wherein the lower body container and the upper body cap are double walled.

12. An insulating beverage container with closure and integrated straw comprising:
    an upper body cap including a groove and raised ridges on the upper plane surface thereof;
    a lower body container coupled to the upper body cap;
    a swivel handle attached to the lower body container;
    an integrated straw including a flexible straw and a tube, wherein the flexible straw is sized to ensleeve the tube and
    said swivel handle is attached to the lower body container by means of one or more circular screw threads molded onto the outside wall or walls of the lower body container and sealed with a clamp mechanism glued to the center of the circular screw thread.

* * * * *